(12) United States Patent
Ansell et al.

(10) Patent No.: US 10,004,309 B2
(45) Date of Patent: Jun. 26, 2018

(54) CONTACT LENS PACKAGE LIMITING ABSORPTION OF KETOTIFEN

(71) Applicant: Johnson & Johnson Vision Care, Inc., Jacksonville, FL (US)

(72) Inventors: Scott Ansell, Jacksonville, FL (US); W. Douglas Lilac, Saint Johns, FL (US); Jay S. Swamy, Saint Johns, FL (US); Ramprasad Halthore, Downingtown, PA (US)

(73) Assignee: Johnson & Johnson Vision Care Inc, Jacksonville, FL (US)

( * ) Notice: Subject to any disclaimer, the term of this patent is extended or adjusted under 35 U.S.C. 154(b) by 288 days.

(21) Appl. No.: 14/807,139

(22) Filed: Jul. 23, 2015

(65) Prior Publication Data

US 2016/0051020 A1    Feb. 25, 2016

Related U.S. Application Data

(60) Provisional application No. 62/028,466, filed on Jul. 24, 2014.

(51) Int. Cl.
| | | |
|---|---|---|
| *B32B 27/32* | (2006.01) | |
| *B32B 15/06* | (2006.01) | |
| *B32B 27/08* | (2006.01) | |
| *B32B 15/20* | (2006.01) | |
| *B32B 27/40* | (2006.01) | |
| *B32B 15/08* | (2006.01) | |
| *B32B 27/36* | (2006.01) | |
| *A45C 11/00* | (2006.01) | |
| *B32B 7/12* | (2006.01) | |

(52) U.S. Cl.
CPC .............. *A45C 11/005* (2013.01); *B32B 7/12* (2013.01); *B32B 15/06* (2013.01); *B32B 15/08* (2013.01); *B32B 15/20* (2013.01); *B32B 27/08* (2013.01); *B32B 27/32* (2013.01); *B32B 27/325* (2013.01); *B32B 27/36* (2013.01); *B32B 27/365* (2013.01); *B32B 27/40* (2013.01); *B32B 2270/00* (2013.01); *B32B 2307/31* (2013.01); *B32B 2307/518* (2013.01); *B32B 2307/7246* (2013.01); *B32B 2307/75* (2013.01); *B32B 2439/80* (2013.01)

(58) Field of Classification Search
None
See application file for complete search history.

(56) References Cited

U.S. PATENT DOCUMENTS

2002/0197478 A1* 12/2002 Muggli .................... A61L 2/10
428/411.1

OTHER PUBLICATIONS

Zeon Product Process, Oct. 18, 2017, https://www.zeonex.com/about.aspx.html.
Suzuki, et al., Introduction to Cyclo Olefin Polymer (COP)—Key Properties Update, p. 1.
Zeon Safety Data Sheet, SDS No. Z02812, p. 1-8.
Zeon COP (Cyclo Olefin Polymer) Zeonex Injection Molding Guide, Aug. 2013, pp. 1-16.
Yamazaki, Masahiro, Industrialization and application development of cyclo-olefin polmer, Journal of Molecular Catalysis A: Chemical 213 (2004) pp. 81-87.
Zeon Cyclo-olefin polymers (COP)—ZEONOR General-purpose engineering plastics, http://www.zeon.co.jp/business_e/enterprise/speplast/speplast2.html?prt=true&c=Oct. 18, 2017 pp. 1-4.
Shin, et al., Chemical Structure and Physical Properties of Cyclic Olefin Copolymers, Pure Appl. Chem., vol. 77, No. 5, pp. 801-814, 2005.

* cited by examiner

*Primary Examiner* — Sheeba Ahmed

(57) ABSTRACT

The invention provides a package for storing medical devices that substantially eliminates elution of a pharmaceutical agent, from the device into the package. As well, a new lidstock is described for use with the package, which results in better retention of drug throughout the bowl and lidstock.

17 Claims, 6 Drawing Sheets

CONTACT LENS PACKAGE LIMITING ABSORPTION OF KETOTIFEN

FIELD OF THE INVENTION

This invention relates to packages for storing drug containing contact lenses where the absorption of drugs into the package is reduced. In particular, there are described lens packages in which drug agents such as ketotifen are not absorbed into the contact lens packages. In addition, a novel lidstock is provided to seal such a package.

BACKGROUND OF THE INVENTION

Contact lenses have been used commercially to improve vision since the 1950s. Conventional lenses typically are made of so-called "hard" or "soft" materials. Soft contact lenses have been developed as drug delivery devices for the ophthalmic environment wherein the pharmaceutical agent is added to the packing solution that is contained in the contact lens package. The contact lens absorbs the pharmaceutical agent and then delivers the agent to the ocular environment when the user wears the contact lens. As well, the lens package may encounter microbes, and lead to infections of the lens wearer. To address the issue of microbial infections, antimicrobial agents, have been added to contact lenses, as for example in U.S. application Ser. Nos. 10/028,400, 10/029,526 and 60/428,620, the disclosure of which all are hereby incorporated in their entireties by reference. The pharmaceutical or antimicrobial agent may be incorporated into the body of the lens, coated onto the lens surface, or included in the lens packaging solution. In this way, it is envisioned that the package would allow greater uptake of drug from the lens without the drug inadvertently being absorbed (or adsorbed) into the package itself.

Conventional contact lens packages are composed of a molded plastic base and a sheet overlying the top of the base. The cover sheet typically is a foil sheet laminated with a bottom layer of another material that is similar in composition to the molded plastic base. While sealing the contact lens packages with the laminated foil sheet, the two like materials are heat sealed together to provide a tight seal.

BRIEF DESCRIPTION OF THE INVENTION

The base element of the primary lens-holding package may be made from polymers, rubbers, or plastics that are compatible with the chemical and physical properties of the lens, the pharmaceutical or antimicrobial agent, and any solution in which the lens may be stored. Examples of suitable base element materials include, without limitation, polypropylene, polyethylene, nylons, olefin co-polymers, including chemicals known as COPs (Cyclic Olefin Polymers) and COCs, (Cyclic Olefin Co-polymers) acrylics, rubbers, urethanes, polycarbonates, fluorocarbons, and the like and copolymers and blends of the foregoing. Among the materials chosen are, without limitation, polypropylene, cyclic olefins including without limitation, ZEONEX™ 690R, Exxon ACHIEVE™ 1605, copolymers of polypropylene and polyethylene, blends such as blends of polypropylene with ZEONEX 690R and the like and combinations thereof. These elements are then combined in a different fashion to form a sealing, but not absorptive lidstock. It has been found that the use of these COPs and COCs can be particularly advantageous when packaging contact lenses containing medicament for elution from the lens. Whereas other materials tend to absorb the medicament, packages and lidstocks containing COPs or COCs tend to permit the drug to remain in the lens ready for use.

DETAILED DESCRIPTION OF THE INVENTION

The invention provides a package for storing contact lenses that substantially eliminates absorption into a package of a drug or a pharmaceutical agent, antimicrobial agent or both, which agent is incorporated in or coated on the lens or contained in a solution in which the lens is packaged.

The package of the invention will be useful for storing any number of types of contact lenses. However, the invention may find its greatest utility when used for the storage of soft contact lenses containing a pharmaceutical agent, antimicrobial agent, or both and which lenses are made from among other possible components, etafilcon A. Examples of the preferred soft contact lenses for use with the package of the invention are those made from formulations of galyfilcon, senofilcon, etafilcon A, genefilcon A, lenefilcon A, polymacon, balafilcon A, lotrafilcon A. The most particularly preferred contact lenses are made from etafilcon, galyfilcon A, senofilcon A, balafilcon A, and lotrafilcon A.

As well, one of the goals of current contact lens development is to provide packaging for a new line of drug-containing contact lenses. The packaging consists of a polymeric blister and a lidstock (heat-sealed cover). The contact lens and drug-containing fluid are added to the packaging blister prior to heat sealing and the complete assembly is sterilized by autoclave. It has been observed that drug is absorbed into the polymer blister during sterilization. Further examination has shown that the drug continues to be absorbed under ambient conditions, albeit at lower rates. Initial material choice for the blister has been polypropylene (PP), currently used in other contact lens packaging. Through a rigorous approach, applicants have identified some alternative packaging materials that significantly reduce the amount of drug absorption during sterilization.

In addition, methods of forming such a package are disclosed.

Figure 1:
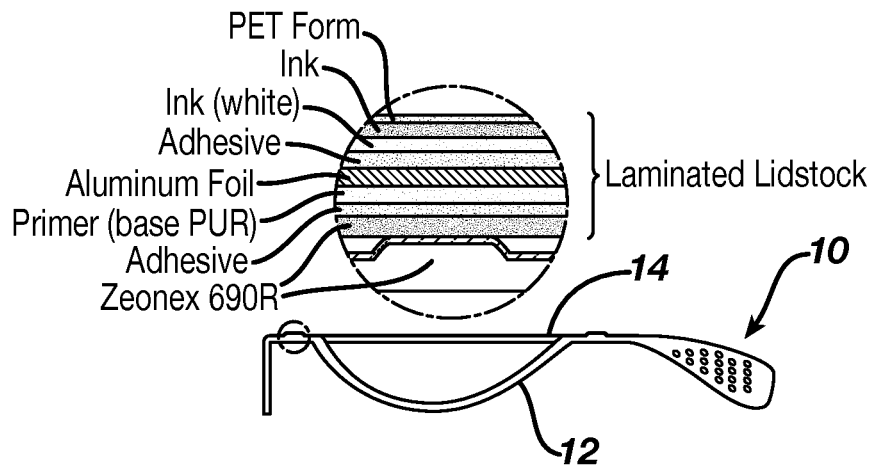
FIG. 1 is one embodiment in perspective of a base element of a package of the invention, containing a bowl; a lid, and a solution for holding a lens.

As can be seen in FIG. 1, there is described a contact lenses package 10. This package 10 has a bowl 12 for holding a contact lens contained in solution, and a lid 14. If the contact lenses has a pharmaceutical agent contained therein, there can be a concern that drug will get absorbed into package 10. The package 10 should be made of materials which ideally prevent such leakage (or absorption) of drug therein.

EXAMPLE 1

Drug absorption is driven by solubility and diffusivity of the drug in the polymer matrix. Several factors contribute to solubility and diffusivity within polymers, including the free volume of the polymer, the cohesive forces between the polymer chains, and the compatibility between the drug and the polymer. These properties are modeled using molecular dynamics. They can also be estimated using structure-property relationships. Several structure-property relationships (i.e. the QSPR model) are selected to predict of many polymer properties, including, glass transition temperature, $T_g$, dipole moment, $\mu$ solubility parameter, $\delta$, permeability, and others. A similar type of model could be developed to describe absorption of the drug ketotifen (or more technically, ketotifen fumarate, both of which will be used interchangeably herein) as a function of polymer structure. Several structurally diverse polymers are obtained, their relevant properties tabulated, drug absorption determined, and a QSPR model is then developed.

Materials and Methods

Approximately 30 structurally diverse polymers were identified based on the following criteria:

Manufacturing friendliness or "processability" (e.g., is it injection moldable?)

Optical clarity

Glass transition temperature or heat deflection temperature (preferably greater than 100° C.)

Ability to be used in a package for regulated medical devices

Availability of structure information

Water Vapor Transmission Rate (WVTR)

Drug absorption test specimens were cut from each polymer. Each specimen was approximately 12.5×6×2 mm³. Two specimens comprised one sample. Dimensions and mass were recorded for all specimens. All samples were cleaned by immersion in a 0.1% sodium dodecyl sulfate solution with sonication. The samples were rinsed with ultrapure water with sonication and patted dry with a Kim Wipe. All samples were handled with sterile gloves once cleaned. The samples were then conditioned 24 hrs at room temperature and 50% relative humidity. Samples were packaged individually, labeled with a sample number, and provided blind. Absorption data consisting of μg ketotifen/mL remaining in the suspending medium following the absorption study. This value was converted to an absolute absorption expressed as μg ketotifen absorbed per cm² of polymer surface area, using the recorded sample dimensions.

The following properties/parameters were tabulated for each of the selected polymers:

FW—Formula weight (g/mol)
$V_m$—Molar volume (cm³/mol)
$V_w$—Van derWaals volume (cm³/mol)
$V_f$—Free volume (cm³/mol, f(V m,V w))
$\rho$—Density (g/cm³)
$E_{coh}$—Cohesive energy (J/mol)
$\delta$—Solubility parameter (MPa$^{1/2}$)
$T_g$—Glass transition temperature (K)
$\in$—Dielectric constant
n—Refractive index $\mu$—Dipole moment (debye, f($\in$,n))
$l_m$—Monomer length (Å)
N—Number of heavy atoms
$N_{rot}$—Number of rotatable bonds All values were determined for the polymer repeat unit. Literature values were used when available. Values were estimated using published QSPR methods or molecular modeling. Molecular modeling was done, and structures were sketched, then minimized using bond-angle constraints to determine the preferred monomer length (lm) and subsequently energy minimized using a steepest gradient with ultra-fine convergence criteria in combination with the COMPASS force field to determine other necessary properties.

QSPR models of ketotifen absorption were developed using the QSAR and Genetic Function Algorithm (GFA) components of Cerius2 (V4.8, Accelrys Software, Inc., San Diego, Calif.). Tabulated properties and the normalized absorption data for each polymer were imported. A population of QSPR models was evolved using GFA and linear regression of a linear combination of properties. Initial equation length was set to six (6) plus a constant. The initial equation population size was 250. Equations were evolved over 25000 generations using default mutation rates with a bias for equations with fewer terms the than initial equation size.

Models were validated using a "leave-M-out method" whereby a new regression is determined using N-M compounds from the original data set. The resulting model is used to predict the activity of the M compounds removed from the original training set. A total of M*N models are generated. So, for M=1 (i.e. leave-one-out), N models are generated. After all M*N models are generated, a cross-validated $R^2$ can be computed for the predicted activities of the compounds left out of each model. This result and the correlation coefficient of each model are used to assess the strength of the original model. The cross-validated $R^2$ should be as large as possible, but will probably be less than the $R^2$ of the original model. The bootstrap $R^2$, defined as the average squared correlation coefficient of all models generated by the leave-M-out method, should not change significantly from that of the original model; otherwise the original model is sensitive to the choice or accuracy of training data.

Results

A total of 26 polymers (see following table) were analyzed for drug absorption. Two polymers, Delrin and Celcon, are homologues of polyoxymethylene (POM) so their results were averaged. Two polymers, Ultrason S and Udel, are both polysulfones so their results were also averaged. Two polymers, Valox 195 and Hydex, are polybutylene terephthalate (PBT). Hydex is pure PBT while Valox 195 is reportedly a blend. Therefore, the later was removed from the dataset. This left 20 absorption data points for model development. The normalized drug absorption for this data set ranged from zero to about 4.0 μg/cm² with an average of 1.14 μg/cm² and a standard deviation of 1.26 μg/cm².

| List of Polymers Included in the Study | |
|---|---|
| Trade Name | Polymer |
| Nylon 6 | Ertalon 6 SA: Polyamide |
| Celeon | Acetal (PolyOxy-Methylene) Copolymer |
| Clear PVC | HTP 800 Polyvinyl chloride |
| TPX | Polymethylpentene |
| Hydex 4101 | PolyButylene Teraphalate Polyester (PBT-P) |
| Techtron PPS | PolyPhenylene Sulfide |

-continued

List of Polymers Included in the Study

| Trade Name | Polymer |
| --- | --- |
| Ertalyte PET-P | Polyethylene Terephtalate |
| G.E. Valox 195 | PolyButylene Teraphalate Polyester (PBT-P) |
| UHMW PE | Ultra High Molecular Weight Polyethylene |
| G.E. FRI 1001 | Proprietary |
| Ultem 1000 | Polyether Imide |
| Ultrason S 3010 | Polysulfone |
| V 2205 | PC/Copolymer Blend (Proprietary) |
| Solway Polysulfone | Polysulfone |
| G.E. Xylex | Polycarbonate + polyester |
| EXRL 0180 | Proprietary |
| Polypropylene | Polypropylene |
| Kynar | Polyvinylidine Fluoride (PVDF) |
| PMMA | Polymethyl-Methacrylate (Acrylic) |
| PEEK | PolyEtherEtherKetone |
| Noryl | Polyphenylene Oxide-Styrene |
| Halar | Ethylene-ChloroTriFluoroEthylene (ECTFE) |
| Mylar | Polyester film |
| PFA | PerFluoroAlkoxy |
| FEP | TetraFluorEthylene-Perfluorpropylene |
| Delrin | Acetal (PolyOxy-Methylene) Homopolymer |

It was theorized that ketotifen absorption was being driven by synergistic interactions with the polymer, and diffusional opportunities introduced by open polymer structure and high polymer chain mobility. Therefore, polymer properties as described previously would be expected to contribute in some fashion to drug absorption. Single variable linear regression of each of the described parameters and some additional computed parameters indicated reasonable to good correlation with drug absorption, suggesting that appropriate combinations of well-correlated parameters would yield a model with stronger overall correlation of drug absorption.

$V_m/V_w$-$R^2$=0.305
$V_f$-$R^2$=0.286
$T_g$-$R^2$=0.383
$l_m/N$-$R^2$=0.634
$N_{rot}/N$-$R^2$=0.523
Others-$R^2$<0.25

GFA QSPR evolution yielded a collection of four parameter equations of the general form:

$$A = b_0 + b_1\frac{l_m}{N} + b_2\frac{N_{rot}}{N} + b_3\rho + b_4 D$$

where $b_i$ are the regression constants and D is an arbitrary parameter such as $E_{coh}$, $\mu$, etc.

The remaining parameters are as defined previously. During model development data corresponding to Noryl (a polycarbonate/polystyrene PC/PS blend) was consistently reported as an outlier (i.e. deviance>$2\sigma$). As a result, this data point was removed from the data set, leaving 19 data points for model development. In the general model, if D=0, then the three parameter model has a correlation coefficient, R, of 0.950 and a standard error of the estimate of 0.43 µg/cm². The model had a cross-validated $R^2$ of 0.84 and a bootstrap $R^2$ of 0.89, indicating a generally statistically relevant model. Each of the regression coefficients $b_1$, $b_2$, and $b_3$, were significant at 5% using an F-test. The remaining coefficient, $b_4$, was much less significant, but generally could not be rejected using an F-test. For example, the best model included $E_{coh}$. This particular model had a correlation coefficient of 0.960, an s.e.e. of 0.38 µg/cm², and the coefficient $b_4$ could not be rejected by an F-test. This model had a cross validated $R^2$ of 0.87 and a bootstrap $R^2$ of 0.92, indicating a statistically relevant model. On the other hand, another model including Tg also had a correlation coefficient of 0.960, a standard error of the estimate of 0.39 µg/cm², but the coefficient $b_4$ could be rejected for low significance by an F-test.

The following shows the resulting correlation for the best correlation given by the following equation:

$$A = -6.55 + 3.24\frac{l_m}{N} + 3.90\frac{N_{rot}}{N} + 2.01\rho + 4.83 \times 10^{-6} E_{coh|}$$

Figure 5:
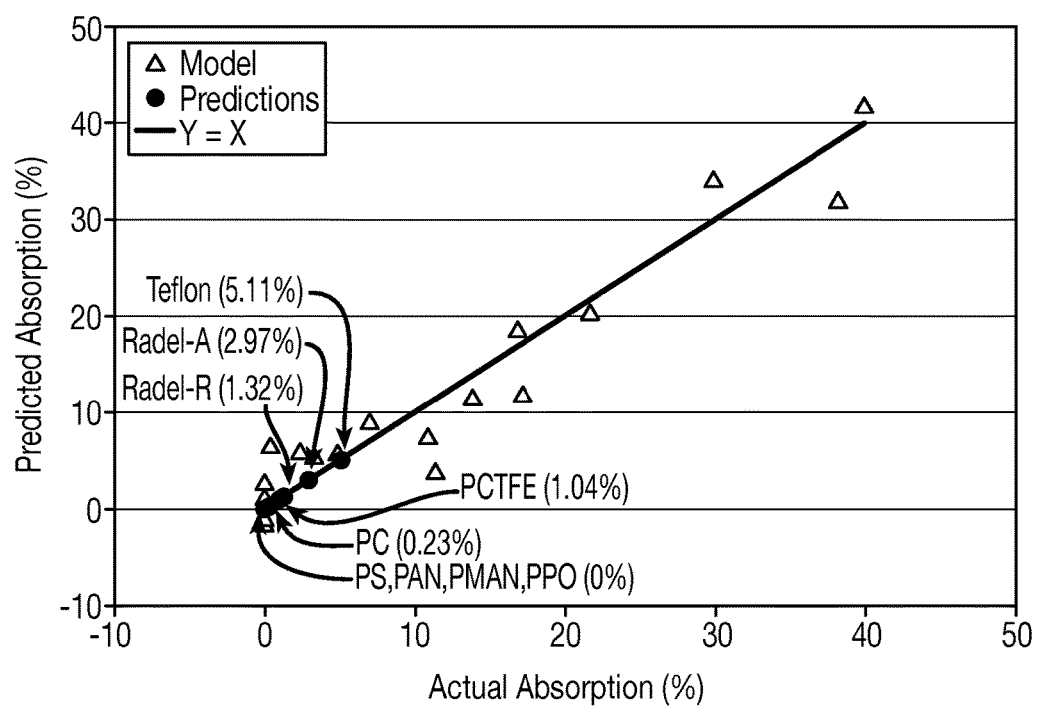
FIG. 5 is a graph of actual absorption rates of ketotifen vs. predicted absorption rates for various materials.

All of the parameters for this model can be readily calculated, with the exception of $E_{coh}$, simply by drawing the structure of the compound. $E_{coh}$, the cohesive energy, is sometimes tabulated and can be calculated from the solubility parameter, which is also often tabulated or can be estimated by molecular dynamics. However, based on statistical analysis, $E_{coh}$ can be eliminated from the model without serious detriment to the predicted absorption. Recall that the resulting model was developed using a surface area-normalized absorption as dictated by the laws of mass transfer. Once the correlation is known, it is possible to express the result as a percentage of total drug absorbed for a given experimental condition. In the present work, the average area of the polymer samples used in the absorption study was 5.40±1.85 cm² (i.e. a variance of 34%), as seen in FIG. 5, which is a Correlation of ketotifen surface area normalized adsorption into various polymer substrates.

Figure 6:
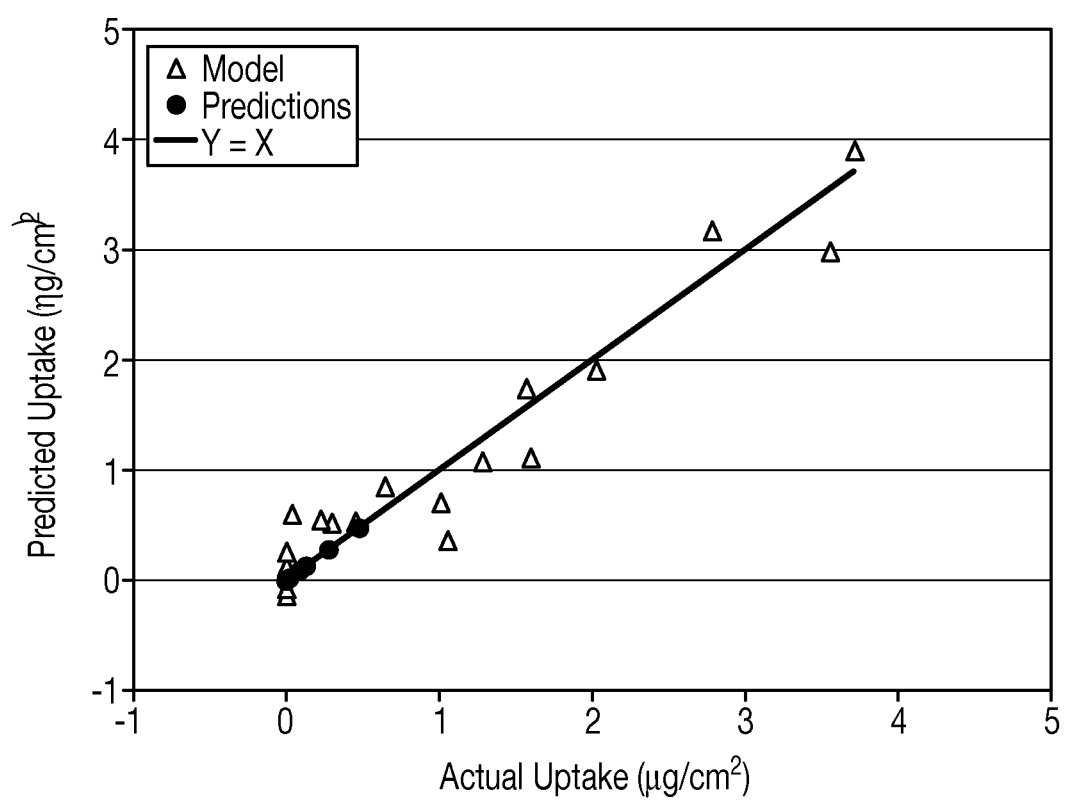
FIG. 6 is a graph of actual uptake of ketotifen vs. predicted uptake of ketotifen.

The next graph (FIG. 6) shows the correlation in terms of percent drug absorbed assuming the average surface area for all samples and the initial fluid conditions. The correlation has a standard error of the estimate of 4.13% drug absorption using these assumptions. Both figures show predicted drug absorption for additional polymers identified during the selection process but not included in the absorption testing. These predictions indicate that polystyrene (PS), polyacrylonitrile (PAN), polymethacrylonitrile (PMAN), and polyphenylene oxide (PPO) could be possible packaging material candidates, which is a Correlation of percentage ketotifen adsorbed into polymer substrates under idealized absorption conditions.

Conclusions

The absorption of ketotifen can be described as:

$$A = -6.55 + 3.24\frac{l_m}{N} + 3.90\frac{N_{rot}}{N} + 2.01\rho + 4.83 \times 10^{-6} E_{coh}$$

where the parameters are easily derived from information about the repeat unit of the polymer. Specifically:

$l_m$ is the bond length- and bond angle-optimized length of the repeat unit in Angstroms $N_{rot}$ is the number or rotatable bonds between heavy atoms in the repeat unit.

N is the number of heavy atoms in the repeat unit.

$\rho$ is the density of the polymer.

$E_{ooh}$ is the cohesive energy of the repeat unit.

The parameters $l_m/N$ and $N_{rot}/N$ are both directly related to the size and flexibility of the polymer. Increases in both these parameters lead to more flexible polymers with lesser diffusional resistance. The given model is a strong and statistically relevant correlation with a correlation coefficient of 0.960 and a standard error of the estimate of 0.38 µg/cm². Conveniently, the $E_{coh}$ is considerably less significant than the remaining parameters. Since it can be more difficult to obtain than the remaining parameters, it can be discarded from the model without significant detriment. The simpler three-parameter model has a correlation coefficient of 0.950 and a standard error of the estimate of 0.43 μg/cm².

Based on the modeling data and additional research, several materials were selected for further investigation. The initial results with Polysulfone material from Solvay Advanced Polymers looked very promising, in that for all methods tested, drug absorption rate was below 5%.

Specific results showing the absorption of polysulfone (PSF) versus a vial control and a polypropylene (PP) blister control tested within eight hours of post-sterilization are summarized as follows:

| Test Material Option | Configuration | Actual Absorption |
|---|---|---|
| Control Vial | No Lens | NA |
| Control PP Blister | No Lens | 60.5% |
| PSF Vial | No Lens | 2.7% |
| Control Vial | With Lens | 1.5% |
| Control PP Blister | With Lens | 47.1% |
| PSF Vial | With Lens | 4.6% |
| PSF Blister/PSF Lidding | No Lens | 0.0% |

Specific results showing the absorption of polysulfone tested at extended time and temperatures of post-sterilization are summarized as follows:

| Test Condition | Days Tested | Polysulfone Absorption |
|---|---|---|
| Ambient | 7 | 2.1% |
| Ambient | 14 | 4.4% |
| Ambient | 21 | 1.7% |
| Ambient | 28 | 1.6% |
| 35 C. | 7 | 3.8% |
| 35 C. | 14 | 2.9% |
| 35 C. | 21 | 4.6% |
| 35 C. | 28 | 5.3% |

Polysulfone was compared to the requirements needed for overall performance of a material to resolve the absorption problem. The table below outlines these results:

| Performance Parameter | Criticality | PSF Actual |
|---|---|---|
| Non-absorptive | Very High | Yes |
| Autoclavable | Very High | Yes |
| Ability To Mold Or Form | Very High | Yes |
| Heat Sealable | Very High | Yes |
| Capable of 2 Year Shelf Life | High | No |
| USP/FDA Compliant | High | Yes |
| Injection Moldable | Medium | Yes |
| ALI Compatible | Medium | Yes |

One important limitation of polysulfone is its poor barrier to water vapor transmission. The contact lens product requires a shelf life of 2 years minimum and the primary package with Polysulfone cannot provide a shelf life of more than 6 month. Due to this limitation, Polysulfone material was eliminated from consideration.

Another material, Polycarbonate copolymer (Lexan from GE) was investigated and the drug absorption results are shown in Table below.

| Test Material Option | Configuration | Actual Absorption |
|---|---|---|
| Control Vial | No Lens | 3.9% |
| Control PP Blister | No Lens | 65.5% |
| GE EXRL0210 Polycarbonate Blister | No Lens | 4.4% |
| Control Vial | With Lens | 2.0% |
| Control PP Blister | With Lens | 52.8% |
| Lexan Blister/Lexan Lidding | No Lens | 5.0% |

Polycarbonate copolymer was compared to the requirements needed for overall performance of a material to resolve the absorption problem. The table below outlines these results:

| Performance Parameter | Criticality | EXRL Actual |
|---|---|---|
| Non-absorptive | Very High | Yes |
| Autoclavable | Very High | Yes |
| Ability To Mold Or Form | Very High | Yes |
| Heat Sealable | Very High | Yes |
| Capable of 2 Year Shelf Life | High | Yes |
| USP/FDA Compliant | High | Yes |
| Injection Moldable | Medium | Yes |
| ALI Compatible | Medium | Yes |

Although Polycarbonate Lexan material has better water vapor barrier than Polysulfone, it also failed to keep the water loss below threshold level (<15%) over 2 year time period. It is known that the water loss of more than 15% will affect the unit dose concentration and the pH, conductivity and osmolality of the packing solution. Therefore alternative materials such as Cyclic Olefin Polymer (COP) and Cyclic Olefin Coplymer (COC) were investigated.

In particular, the present package addresses the use of Cyclic Olefin Polymer (COP) thermoplastic resins which can be used as materials of construction for primary package materials (blister bowl 12 and the sealant layer of lidstock 14) for contact lenses or contact lens solutions containing pharmaceutical, vitamin, nutrient and additive agents, particularly antihistamines such as ketotifen. Additionally, COP can be used as packages for medical device, diagnostic, consumer and pharmaceutical applications due to their low drug absorption and excellent water vapor barrier properties.

Figure 7:
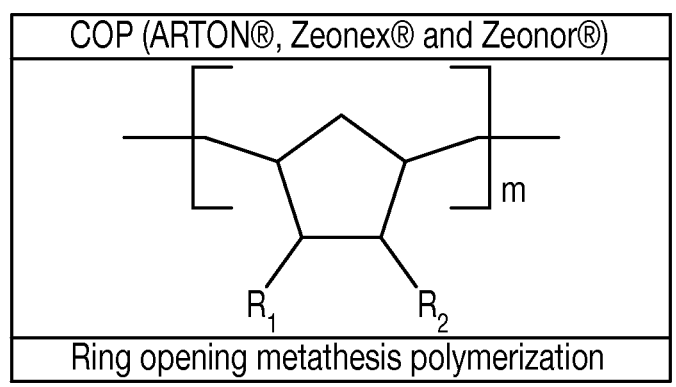
FIG. 7 is a block diagram of COP as used in this invention.

Cyclic Olefin Polymers (as identified in the block diagram of FIG. 7) are produced by ring-opening metathesis polymerization of various cyclic monomers such as 8,9,10-trinorborn-2-ene (norbornene) or 1,2,3,4,4a,5,8,8a-octa-hydro-1,4,5,8-dimethanonaphthalene (tetracyclododecene) followed by hydrogenation (ARTON from Japan Synthetic Rubber, Zeonex and Zeonor from Zeon Chemicals). Typical chemical structures of COP are listed below COP plastic resins are commercially available from Zeon Chemicals, and Japan Synthetic Rubber (JSR). One other COP that seemed to have utility was the polymer known as TOPAS®, sold by Topas Advanced Polymers.

We evaluated various grades of COP with the glass transition temperature (Tg) or heat distortion temperature (HDT)>120° C. from the vendors mentioned above. Table 1 lists the different COP resins tested. We note that the Zeonex and Zeonor COPs have significantly lower moisture permeability than conventional medical plastics, such as PC, Polyester (PET), PP and HDPE.

| Resin Type | Manufacture | Trade Name/ Grade | Sample Type | Tg (° C.) | HDT (° C.) | Flexural Modulus (MPa) |
|---|---|---|---|---|---|---|
| COP | Zeon Chemicals | Zeonex 690R | Coupon/Blister | 136 | — | 2200 |
| | | Zeonex 790R | Coupon | 163 | 161 | 2600 |
| | | Zeonex E48R | Coupon | 139 | 122 | 2500 |
| | | Zeonex 330R | Coupon | 123 | 103 | 3100 |
| | | Zeonor 1420R | Coupon/Blister | 136 | — | 2200 |
| | | Zeonor 1600 | Coupon/Blister | 163 | 161 | 2600 |
| | JSR | ARTON FX4727 | Coupon | 120 | 110 | 3000 |
| | | ARTON FX4726 | Coupon | 125 | 115 | 3000 |
| | | ARTON D4531F | Coupon | 135 | 130 | 3000 |
| | | ARTOND4532 | Coupon | 145 | 140 | 3000 |
| | | ARTONF5023 | Coupon | 167 | 162 | 3000 |
| COP | Daikyo G. Seiko | Resin CZ | Bottle | 140 | 123 | 2354 |

EXAMPLE 2

Testing Procedure Used for Determination of Drug Absorption

The coupons or blister samples were cut to weight approximately 0.4 gram. At least three (3) samples were tested for drug absorption. Each of the samples is immersed in a 6.5 mm vial containing 3 ml of buffered ketotifen solution (BKS). Minimum of six (6) blank (without resin) samples were prepared. Each vial was closed with PTFE coated stoppers and sealed using a crimper. Three (3) of the six (6) blanks were used as controls without sterilization. The remaining three (3) blanks and sample vials were sterilized (124° C. for 18 minutes) using current version of PFDDIDP-0016. The solution from all vials including the controls were extracted and tested by HPLC to determine the amount of ketotifen. Ketotifen loss is the difference between the measured ketotifen in the controls (without resin and unsterilized) and samples (with resin and sterilized). Percentage ketotifen loss is the ketotifen loss expressed in percentage relative to the controls. So:

K loss (Drug loss)=(Ketotifen in unsterilized controls−Ketotifen in sterilized samples); and % K loss=(K loss/Ketotifen in unsterilized control)×100

Figure 8:
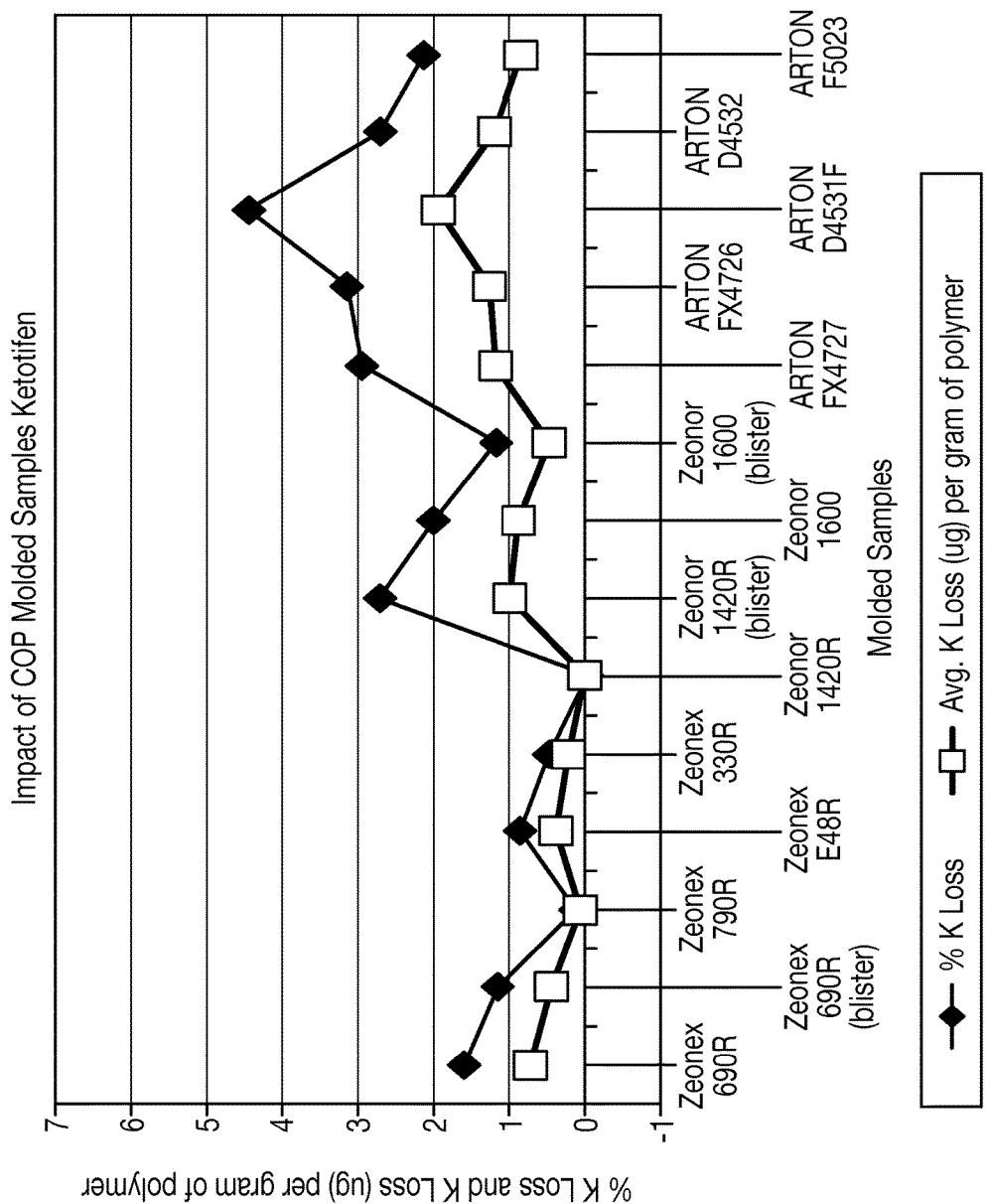
FIG. 8 is a graph of ketotifen loss for various materials used in contact lens packages.

The following table provides a summary of % K Loss (absorption and degradation) on COP samples. It should be noted that all COP samples (N=3) were quite promising, all of which report less than 5% drug loss. (The average drug loss results are also shown in the graph of FIG. 8.)

| Mfr. | Trade Name | Sample | Avg. % K Loss | Avg. Wt. Polymer (g) | Avg. K Loss (μg)/g |
|---|---|---|---|---|---|
| Zeon Chemicals | Zeonex 690R | Coupon | 1.61 | 0.4070 | 0.7100 |
| | | Blister | 1.16 | 0.4723 | 0.4441 |
| | Zeonex 790R | Coupon | 0.11 | 0.4043 | 0.0455 |
| | Zeonex E48R | Coupon | 0.85 | 0.4008 | 0.3755 |
| | Zeonex 330R | Coupon | 0.46 | 0.4001 | 0.2057 |
| | Zeonor 1420R | Coupon | −0.03 | 0.4042 | −0.0135 |
| | | Blister | 2.70 | 0.4835 | 1.0047 |
| | Zeonor 1600 | Coupon | 2.00 | 0.4023 | 0.8813 |
| | | Blister | 1.18 | 0.4681 | 0.4546 |
| JSR | ARTON | Coupon | 2.95 | 0.4555 | 1.1722 |
| | ARTON | Coupon | 3.15 | 0.4527 | 1.2522 |
| | ARTOND4531 | Coupon | 4.43 | 0.4119 | 1.9374 |
| | ARTOND4532 | Coupon | 2.72 | 0.4124 | 1.1914 |
| | ARTONF5023 | Coupon | 2.13 | 0.4534 | 0.8531 |
| Daikyo | Resin CZ | Bottle | 3.12 | 0.4081 | 1.3598 |

These surprising results were in contrast with data from earlier studies, which had indicated 30-60% ketotifen loss in Zeonor and Zeonex blister samples heat sealed with polypropylene lidstock. As a result of the current studies, this is now mainly attributed to the use of the polypropylene (PP) lidstock used in earlier studies. The melt temperature of polypropylene and COP resins are different and it appears that polypropylene does not provide robust bond strength to COP resulting in significant water and ketotifen loss after sterilization.

Water vapor transmission rate (WVTR) of Zeonex 690R (COP) is a 0.014 g/(m^2·Day) whereas WVTR of Lexan is 0.229 g/(m^2·Day). Due to low WVTR of COP, primary packages made with COP as materials of constructions shows low levels of water loss during the shelf life of the product compared to Lexan. Due to reduced water loss from the primary package, water loss-sensitive lens properties like pH, osmolality, conductivity, water content and refractive index are less affected. In addition, because of the reduced water loss from COP packages, the shelf life of the lens containing ketotifen will be longer relative to the Lexan packages.

Figure 2:
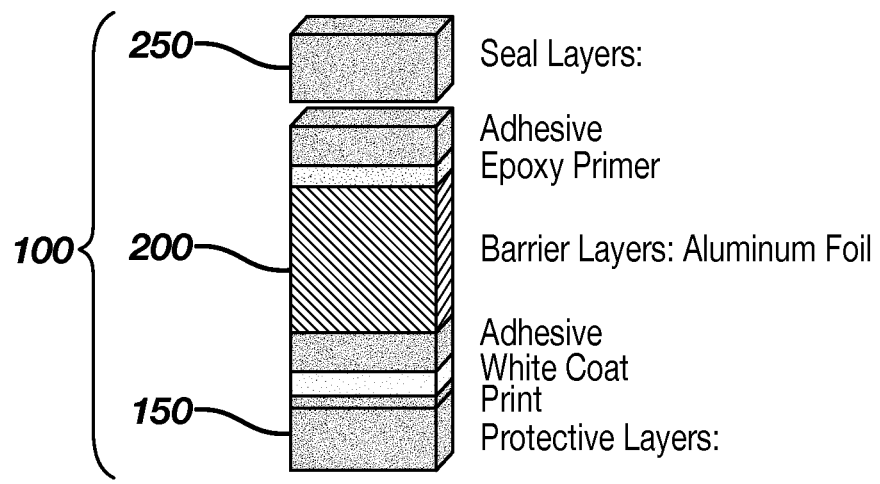
FIG. 2 is a graphic block representation of a novel lid stock for use of the package of FIG. 1.

As further seen herein, there is described a new lidstock 100 for use with this package. The lidstock 100 is a multi-layer laminate which includes a protective layer 150, a barrier layer 200 and a sealant layer 250 as shown in FIG. 2. The total thickness of the entire lidstock structure is around 90 μm. Thus, such a package is able to provide for a sterile seal, and also passes package integrity testing for contact lens packaging.

Figure 3:
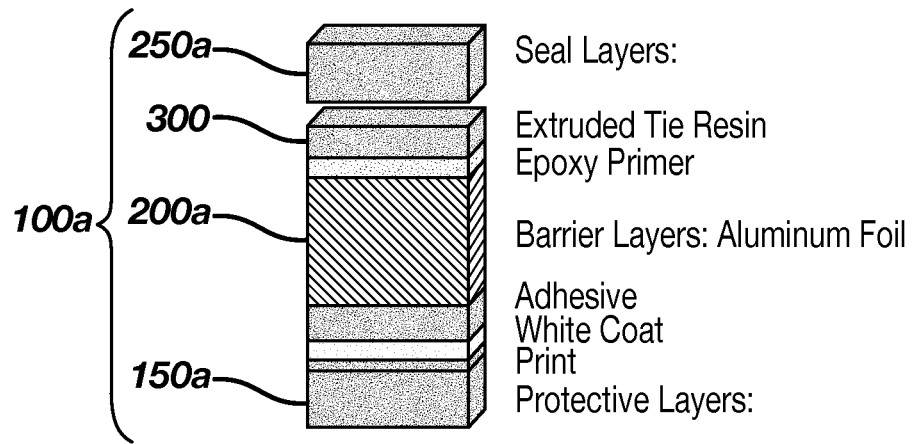
FIG. 3 is an alternate representation of a lidstock for use with the bowl or blister of FIG. 1.
Figure 4:
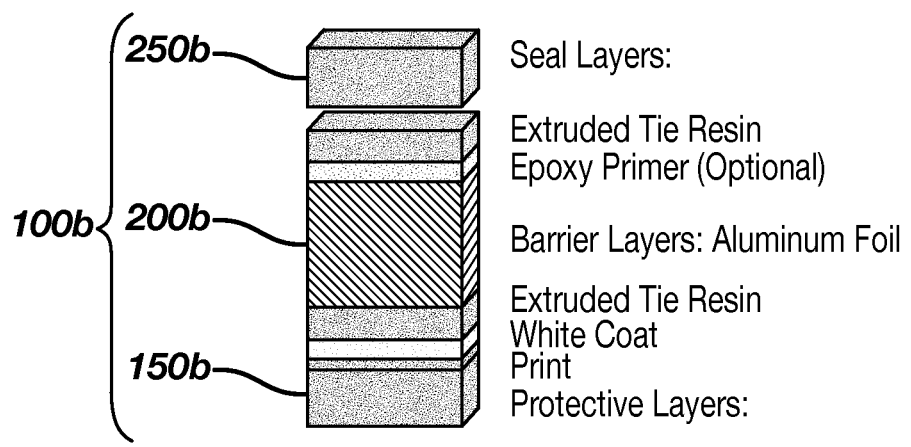
FIG. 4 is a second alternate embodiment of a lidstock for use with the bowl or blister of FIG. 1.

In an illustrative embodiment 100 as shown in FIG. 2, the protective layer 150 is made from Polyethylene Terephthalate (PET). It is to be noted that the protective layer 150 can also be oriented polypropylene (OPP) or biaxially oriented nylon (BON). This lidstock 100 may contain one or more protective layers 150, in order to improve functional or processing characteristics. The thickness of the entire protective layer 150 is optimally in the range of 8 μm to 40 μm. For instance, in a series of illustrative embodiments of lidstocks, the thickness of a PET protective layer 150, 150a or 150b as seen in lidstock 100, 100a or 100b respectively as shown in FIGS. 2, 3 & 4 is 12 μm. The protective layer can be printed, either on its surface or its underside (i.e. "reverse" printed.) The PET protective layer 150, 150a and 150b is reverse printed in structure 100, 100a and 100b as shown in FIGS. 2, 3 & 4. (It is to be noted that "like" numerical identifiers, e.g., lidstocks 100, 100a, 100b, and so forth, as contained in FIGS. 2, 3, 4, are indicative of like functions.)

In this illustrative lidstock 100 as shown in FIG. 2, the barrier layer 200 is aluminum foil. The thickness of aluminum foil protective layer 200 can be in the range of 8μ to 75 μm. The thickness of aluminum foil 200, 200a, 200b in the lidstocks 100, 100a, 100b, respectively, as seen in FIGS. 2, 3 and 4 is 50 μm. The barrier layer can also be any non-foil high barrier films such as AlOx/SiOx coated film or Polychloro-tri-fluoro-ethylene (sold under the tradename ACLAR). There can be one or more barrier layers 200 in the lidstock 100.

In this illustrative lidstock 100 is shown in FIG. 2, the sealant layer 250 is made from the Cyclic Olefin Polymer (COP) Zeonex 690R. The film can also be produced using other COP resin grades such as Zeonor 1430R. The Tg of the COP resin must be higher than its sterilization temperature to minimize drug absorption. The thickness of sealant layer 250 can be in the range of 6μ to 50 μm. Ideally, the thickness of COP sealant layers 250, 250a, 250b as seen in lidstocks 100, 100a, 100b shown in FIGS. 2, 3 & 4 is 16.5 μm. The seal layer can also be Cyclic Olefin Copolymer (COC) or a blend of COP and COC or a blend of COP or COC with polypropylene or an elastomer.

The sealant layer 250 can be extruded on a cast (preferred) or blown extrusion line. In the illustrative structure 100 as shown in FIG. 2, the COP sealant is a monolayer film produced on a cast extrusion line using Zeonex 690R resin. Equally promising results are expected from a cast extrusion using Zeonor 1430R resin. This property is attributed to its lower melt viscosity.

The COP sealant layer 250 can be a multi-layered co-extruded film. A multi-layer film structure may consist of polypropylene or COP/COC blend in the core or in the outer (skin-facing) layer (a non-seal layer) with 100% COP or 100% COC or COP/COC blend in the sealant layer 250.

The COP sealant layer 250 can also be extrusion coated on to a barrier layer (such as aluminum foil) using extrudable tie resin. An extrudable tie resin can be maleic anhydride modified polypropylene or other resins or resin blends that preferably have a glass transition temperature (Tg) higher than 120 C with good adhesion characteristics to COP sealant layer and the barrier layer. The tie layer 300 in lidstock 100a in FIG. 3 is a maleic anhydride modified polypropylene with a (Tg) of 121 C which is placed in between the sealant layer 250a and barrier layer 200a.

Protective layer 150, barrier layer 200, and sealant layers 250 in lidstock 100 as shown in FIG. 2 are adhered using solvent and/or solventless-based adhesive. These materials can also be bonded together using extrusion lamination as shown in FIG. 4.

During the lens manufacturing process, the lidstock 100 is placed over the blister with a lens and saline solution inside. It is then heat sealed and sterilized. As a result, the COP blister with the specially constructed lidstock film proves as an effective package. In the case of ketotifen coated contact lenses, it produces the ability to place the drug coated lens on the shelf for up to two years with minimal ketotifen leaching into the package. This lidstock also serves to optimize the WVTR for the package, which is a key parameter to achieve drug retention, as measured either in the package or on the lens itself.

Thus, it can be appreciated that the package and lidstock herein described is useful in the packaging of contact lenses. As well, these package materials are likely useful for other products and applications in packaging for medical devices, diagnostic, consumer and pharmaceutical packaging.

What is claimed is:

1. A package for holding a contact lens, comprising a base element in the form of a bowl, and a lidstock covering said bowl, wherein said base element is made from a cyclic olefin polymer or copolymeric material, wherein the base element material is selected from a material created from a ring-opening metathesis polymerization of cyclic monomers chosen from 8,9,10-trinorborn-2-ene or 1,2,3,4,4a,5,8,8a-octahydro-1,4,5,8-dimethanonaphthalene followed by hydrogenation.

2. The package of claim 1 wherein said cyclic olefin polymer material is ZEONEX 690R.

3. The package of claim 1 wherein said contact lens contains a drug for elution therefrom, and the package contains saline solution.

4. The package of claim 3 wherein over its shelf life, the base element does not absorb greater than five percent of the drug contained in said lens.

5. The package of claim 4 wherein the base element does not absorb greater than two percent of the drug contained in said lens.

6. The package of claim 3 wherein the drug is ketotifen fumarate.

7. The package of claim 1 wherein the lidstock is formed from a multilayered polymeric sheet, and at least one of said layers is the same as that of the base element.

8. A lidstock for use with a contact lens package, said lidstock formed from a multilayered sheet and containing a sealing layer formed from a material created from a ring-opening metathesis polymerization of cyclic monomers chosen from 8,9,10-trinorborn-2-ene or 1,2,3,4,4a,5,8,8a-octahydro-1,4,5,8-dimethanonaphthalene followed by hydrogenation.

9. The lidstock of claim 8 wherein said sealing layer is part of a sheet of at least three layers, and wherein the other two layers are a protective layer and a foil barrier layer.

10. The lidstock of claim 9 wherein said lidstock contains ZEONEX 690R.

11. The lidstock of claim 9 wherein said lidstock contains ZEONOR 1430R.

12. The lidstock of claim 8 wherein the protective layer is formed from polyethylene terephthalate (PET).

13. The lidstock of claim 8 wherein the barrier layer is formed from aluminum foil.

14. The lidstock of claim 9 wherein the barrier layer is contained between the sealing layer and the protective layer.

15. The lidstock of claim 8 further forming part of a contact lens package formed from a bowl, wherein the bowl and the lidstock are formed from generally the same cyclic olefin polymer material.

16. The lidstock of claim 9 wherein the lidstock contains ZEONOR 1430R.

17. In combination:
a contact lens; and
a package for holding said contact lens, said package comprising: a base element in the form of a bowl; and a lidstock covering said bowl, wherein said base element is made from a cyclic olefin polymer or copolymeric material, and said lidstock is formed from a multilayered sheet and containing a sealing layer formed from a material created from a ring-opening metathesis polymerization of cyclic monomers chosen from 8,9,10-trinorborn-2-ene or 1,2,3,4,4a,5,8,8a-octahydro-1,4,5,8-dimethanonaphthalene followed by hydrogenation.

* * * * *